(12) United States Patent
McCartney

(10) Patent No.: US 8,286,535 B1
(45) Date of Patent: Oct. 16, 2012

(54) LUG BOLT WRENCH WITH STEP PAD

(76) Inventor: Andrew McCartney, Sunland, CA (US)

( * ) Notice: Subject to any disclaimer, the term of this patent is extended or adjusted under 35 U.S.C. 154(b) by 317 days.

(21) Appl. No.: 12/798,637

(22) Filed: Apr. 7, 2010

Related U.S. Application Data

(63) Continuation-in-part of application No. 12/151,802, filed on May 9, 2008, now abandoned.

(51) Int. Cl.
| | | |
|---|---|---|
| *B25B 23/00* | (2006.01) | |
| *B25B 23/16* | (2006.01) | |
| *B25F 1/00* | (2006.01) | |
| *B62M 3/00* | (2006.01) | |
| *B66F 15/00* | (2006.01) | |

(52) U.S. Cl. ............ 81/180.1; 81/462; 81/177.2; 7/100; 74/594.6; 254/21; 254/25

(58) Field of Classification Search .................. 81/180.1, 81/462, 177.2; 7/100; 74/594.6
See application file for complete search history.

(56) References Cited

U.S. PATENT DOCUMENTS

| | | | | |
|---|---|---|---|---|
| 3,973,283 | A | * | 8/1976 | Boe .................................... 7/100 |
| 5,910,198 | A | * | 6/1999 | Maher et al. ..................... 81/462 |
| 6,748,832 | B1 | * | 6/2004 | Maxwell ......................... 81/462 |
| 7,121,175 | B2 | * | 10/2006 | Anderson ....................... 81/462 |

* cited by examiner

*Primary Examiner* — Monica Carter
*Assistant Examiner* — Danny Hong
(74) *Attorney, Agent, or Firm* — Sandy Lipkin

(57) ABSTRACT

A wrench for handling a fastener, involving an elongated member with a proximal end and a distal end, a step pad being disposed proximate the elongated member proximal end and for providing additional torque, and an adapter being disposed proximate the elongated member distal end. The adapter may include an element, such as a socket member and a ratchet member. The elongated member distal end may include a tool member.

7 Claims, 4 Drawing Sheets

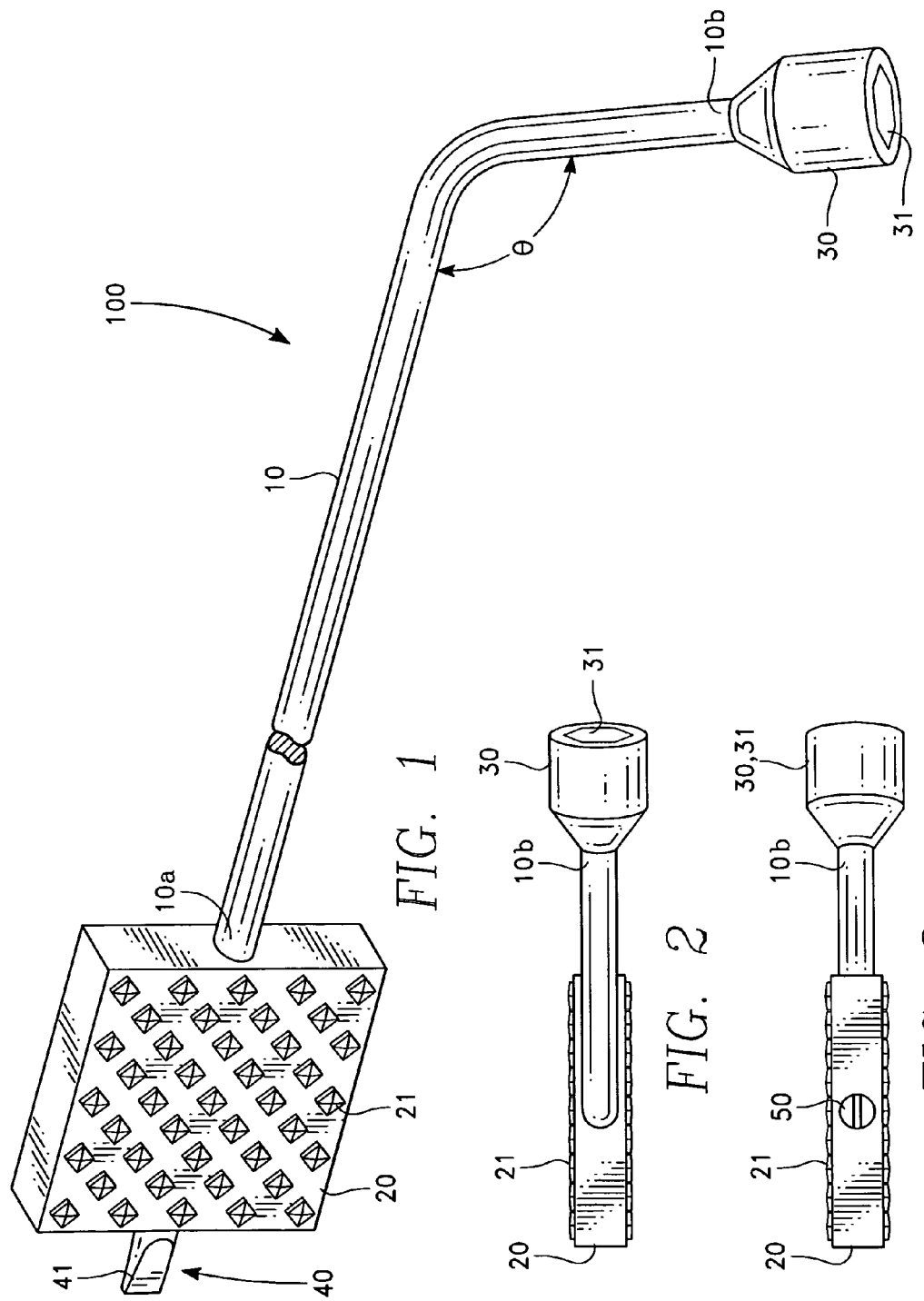

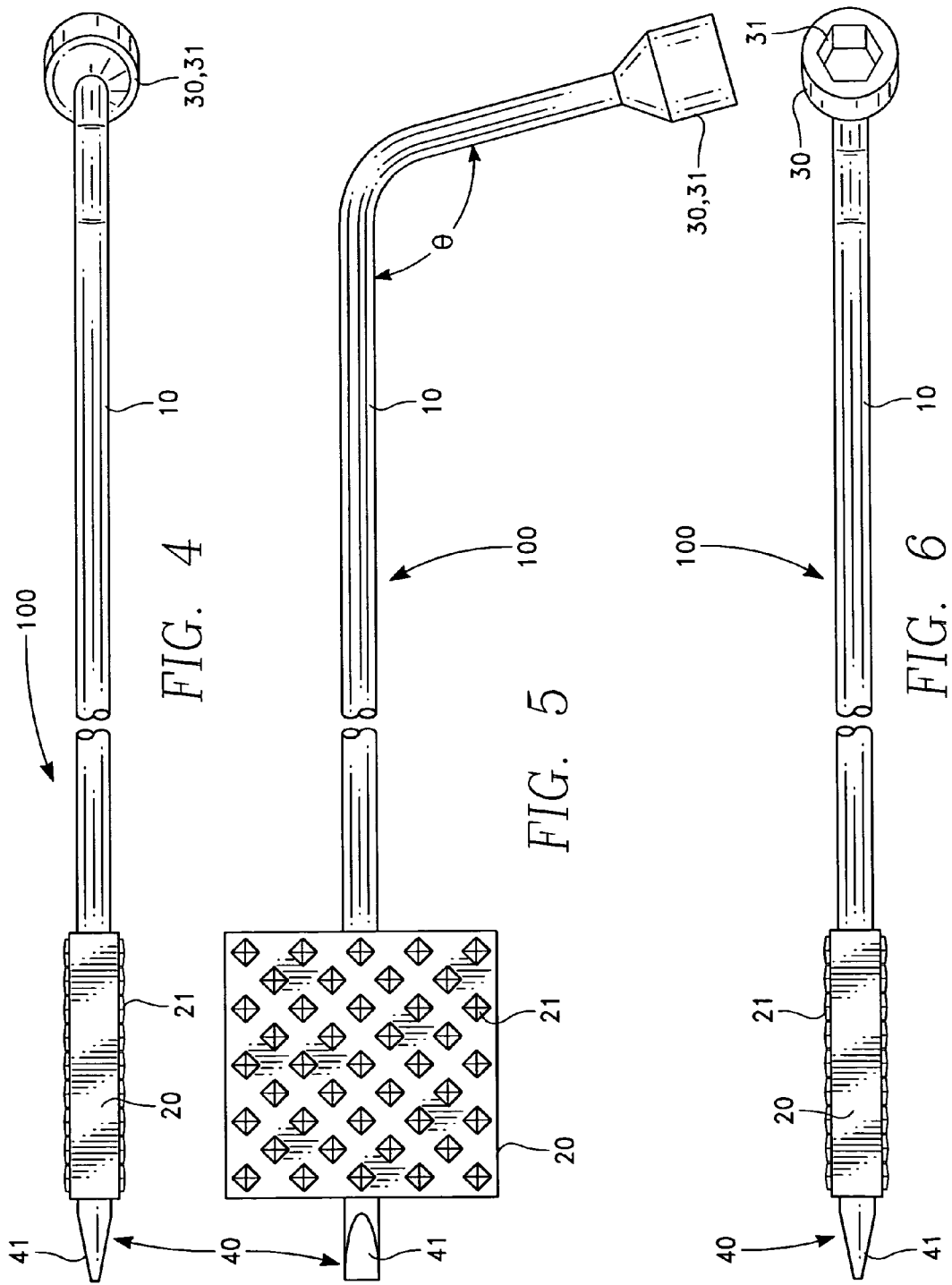

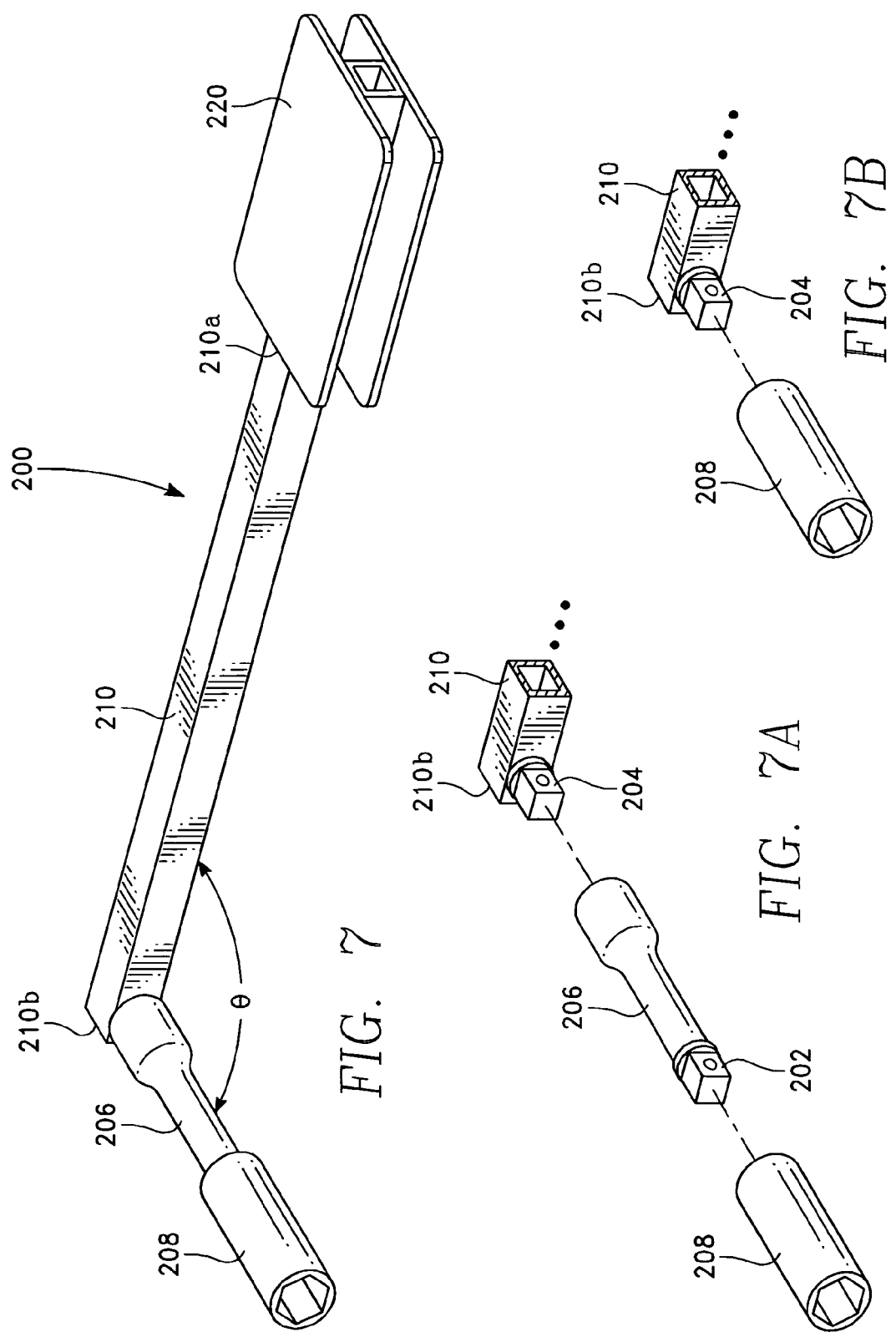

LUG BOLT WRENCH WITH STEP PAD

CROSS-REFERENCE TO RELATED APPLICATIONS

This document is a continuation-in-part application that is related to, and claims priority through U.S. patent application Ser. No. 12/151,802, filed May 9, 2008 by Andrew McCartney, entitled LUG BOLT WRENCH WITH STEP PAD now abandoned, which claims priority to and through U.S. Design Pat. application Serial No. 29/292,205, filed on Oct. 1, 2007, also entitled LUG BOLT WRENCH WITH STEP PAD, now issued as U.S. Design Pat. No. D578,926, that is, in turn, related to, and claims priority from, U.S. Design Pat. application Serial No. 29/257,081, filed on Mar. 28, 2006, also entitled LUG BOLT WRENCH WITH STEP PAD, now issued as U.S. Design Pat. No. D551,926 on Oct. 2, 2007, all the subject matter of which are incorporated herein in their entirety by reference.

BACKGROUND OF THE INVENTION

1. Field of the Invention

The field of this invention relates generally toward motor vehicle tools and more particularly toward tools for servicing wheels, tires, and brakes of a motor vehicle. Even more particularly, the present invention technically relates to tools for removing and tightening the lug bolts of the wheels of a motor vehicle.

2. Description of the Prior Art

Various devices for removing and tightening lug bolts have been available in the related art. One such invention is the conventional lug bolt wrench or tire iron comprising crossbars having integrally formed sockets for accommodating only four sizes of lug bolts. Other related art inventions include a conventional crescent wrench, having a fixed size, a ratchet having a socket for accommodating the head of a lug bolt, and the like. Channel locks may be used for removing lug bolts, but they are impractical in that maneuvering them around, various wheel configurations may be difficult. However, these related art inventions are further difficult to use for large lug bolts as are found on large heavy motor vehicles, such as tractor-trailers for inland freight. Such lug bolts are installed using substantial torque and are removed using substantial impact. Thus, these lug bolts are difficult to service without an air-assisted impact wrench which would be available in a typical service garage. However, in the field or on the road, an air-assisted impact wrench would not usually be available. Accordingly, a long-felt need remains for a wrench that can be used in the field or on the road which provides sufficient torque and impact for removing and replacing lug bolts with respect to motor vehicles, especially heavy duty vehicles.

SUMMARY OF THE INVENTION

The present invention involves a wrench for handling a fastener, e.g., a heavy duty lug bolt from a wheel of a motor vehicle, e.g., a tractor trailer, in the field or on the road. The present invention wrench generally comprises an elongated member having a proximal end and a distal end, a step being disposed proximate the elongated member proximal end and for providing additional impact and torque. The elongated member is bent at an angle and is either integrally formed with or releasably attached to a tool portion that is capable of having an adjustable length to provide the torque as needed. There is an adapter disposed proximate the tool portion. The adapter comprises an element, such as a socket member. The elongated member distal end also includes a tool member on the opposite side of the foot bad.

The present invention further involves a method of handling a fastener by way of a wrench, as discussed, supra. The present invention handling method generally comprises the steps of providing an elongated member having a proximal end and a distal end, providing a step pad being disposed proximate the elongated member proximal end and for providing additional impact and torque, and providing an adapter being disposed proximate the tool portion, disposing the adapter into a fastener, and applying a force onto the step pad by a user's foot, thereby loosening the fastener from, or tightening the fastener to, the wheel. Additionally, an extending member can be positioned between said adapter and said elongated member through the attachment of an elongated piece to said tool portion. These and other aspects of the invention will become apparent from a review of the accompanying drawings and specification.

The preferred embodiment teaches a wrench for handling a fastener, comprising: an elongated member having a proximal end and a distal end; a step pad having disposed proximate the elongated member proximal end and for providing additional torque; a tool for attachment to bolts that require tightening or loosening that is also attached to said distal end of said elongated member wherein said tool is detachable to allow for the attachment thereto of extending members to provide for additional length of said tool as needed for additional torque wherein said tool is disposed next to said elongated member at an angle between 0 and 180 degrees; and an adapter located proximate said proximal end of said elongated member.

The above embodiment can be further modified by defining that the angle is between 90 and 120 degrees.

The above embodiment can be further modified by defining that the tool is attached to bolts through a tool selected from the group consisting essentially of a socket member and a ratchet member.

The above embodiment can be further modified by defining that there is a tool member located next to said step pad wherein said tool is selected from the group consisting essentially of a screwdriver, a flathead screwdriver, a Phillips screwdriver, a hexagonal head screwdriver and a prying member.

The above embodiment can be further modified by defining that the step pad comprises at least one configuration selected from a group consisting essentially love a polygonal shape, a square shape, a rectangular shape, a triangular shape, a curved shape, a circular shape, and an elliptical shape.

The above embodiment can be further modified by defining that the step pad comprises a raised feature for providing additional friction for a user's foot.

The above embodiment can be further modified by defining that the raised feature comprises at least one element selected from a group consisting essentially of a tread distribution, a diamond-shaped tread distribution, a herringbone-shaped tread distribution, and an oblique channel-shaped tread distribution.

BRIEF DESCRIPTION OF THE DRAWINGS

For a better understanding of the present invention, reference is made to the below-referenced description of the accompanying drawings. Reference numbers refer to the same or equivalent parts of the present invention throughout the several figures of the drawings.

FIG. 1 is a perspective view of the wrench, comprising an adapter for handling a fastener, such as a lug bolt as would be used on a heavy motor vehicle, and a step pad for facilitating provision of additional impact and torque, in accordance with a first exemplary embodiment of the present invention.

FIG. 2 is a top view of the an adapter, as shown in FIG. 1, in accordance with the first exemplary embodiment of the present invention.

FIG. 3 is a bottom view of an adapter, as shown in FIG. 1, in accordance with the first exemplary embodiment of the present invention.

FIG. 4 is a side view of a wrench, as shown in FIG. 1, in accordance with the first exemplary embodiment of the present invention.

FIG. 5 is a front view of a wrench, as shown in FIG. 1, in accordance with the first exemplary embodiment of the present invention.

FIG. 6 is an opposing side view of a wrench, as shown in FIG. 1, in accordance with the first exemplary embodiment of the present invention.

FIG. 7 us a top perspective view of the preferred embodiment of the instant invention that allows for the adjustability of the length of the tool portion of the instant invention.

FIG. 7A is an exploded close up view of the junction of the tool portion and elongated portion of the wrench of the instant invention shown in FIG. 7, with an extender include.

FIG. 7B is similar to FIG. 7A, but shown without the extender.

DETAILED DESCRIPTION OF A PREFERRED EMBODIMENT

Figure 8:
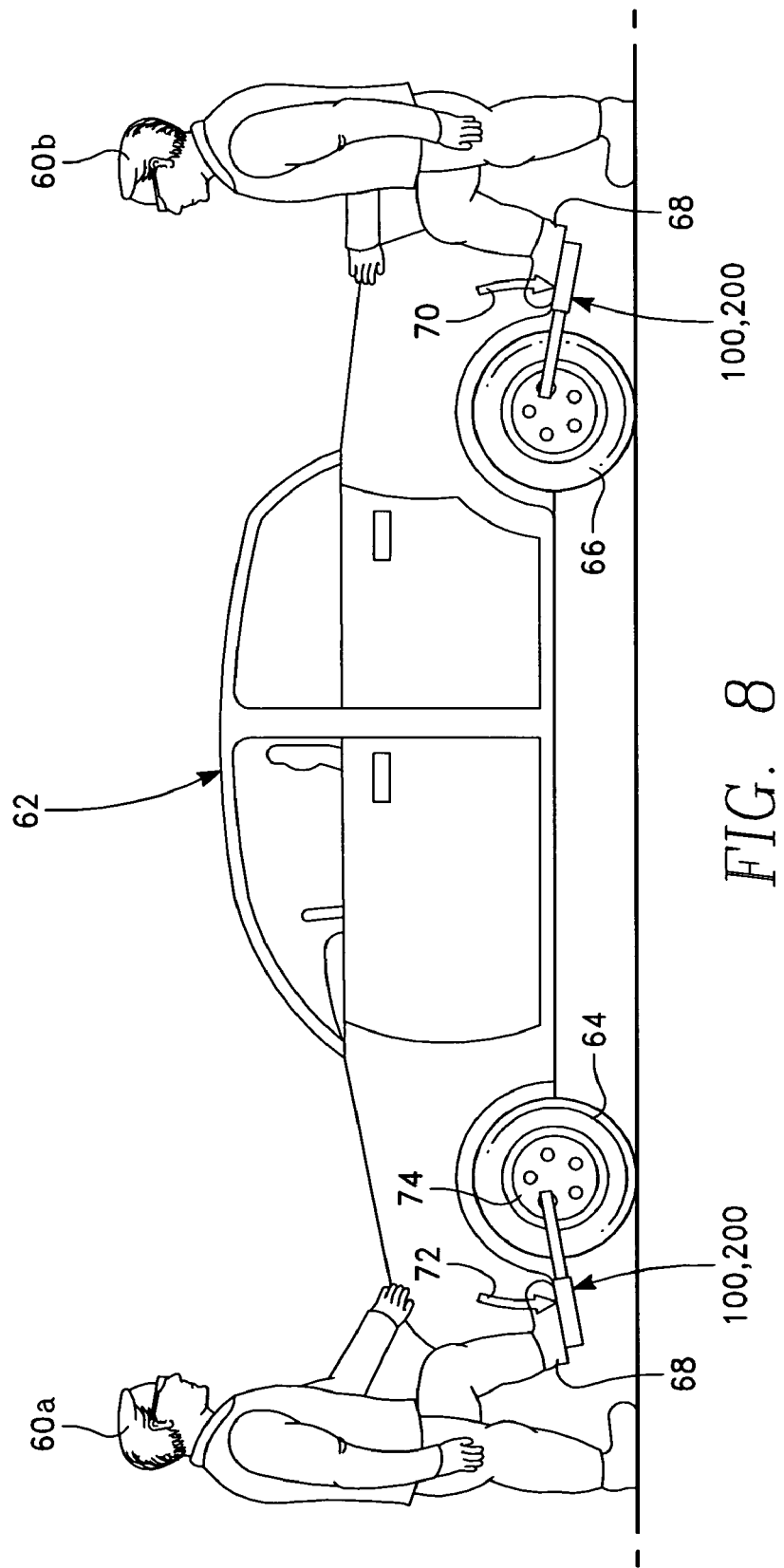
FIG. 8 shows the device in use both tightening and loosening lug bolts.

FIG. 1 is a perspective view of a wrench 100 with a step pad 20 for handling a fastener (not shown), such as a lug bolt (not shown) as would be used on a heavy motor vehicle (not shown), in accordance with a first exemplary embodiment of the present invention. The wrench 100 generally comprises an elongated member 10 having a proximal end 10a and a distal end 10b, a step pad 20 being disposed proximate the elongated member proximal end 10a and for providing additional impact and torque, and an adapter 30 being disposed proximate the elongated member distal end 10b. The adapter 30 comprises an element, such as a socket member 31. On the side of the foot pad 20 opposite the proximal end 10a of the elongated member 10 is situated a tool member 40. The elongated member 10 comprises a bend for facilitating disposing the adapter 30 onto the fastener, wherein the bend comprises an angle theta in a range of approximately 0° to approximately 180°, preferably in a range of approximately 90° to approximately 120°. (See also FIG. 7.)

Referring to FIG. 1, the step pad 20 comprises a configuration, such as a polygonal shape, a square shape, a rectangular shape, a triangular shape, a curved shape, a circular shape, and an elliptical shape. The step pad 20 comprises a raised feature 21 for providing additional friction for a user's foot (not shown), wherein the raised feature 21 comprises an element selected from a group consisting essentially of tread distribution, a diamond-shaped distribution, a herringbone-shaped tread distribution, and an oblique channel-shaped treat distribution.

FIG. 2 is a top view of an adapter 30, comprising a socket member 31, as shown in FIG. 1, in accordance with the first exemplary embodiment of the present invention. FIG. 3 is a bottom view of an adapter 30, as shown in FIG. 1, in accordance with the first exemplary embodiment of the present invention. The wrench 100 further comprises an adjusting member 50 for disposing the socket member 31 in relation to the elongated member 10. The adjusting member 50 comprises an element such as a screw, a set screw, a pin member.

FIG. 4 is a side view of a wrench 100, as shown in FIG. 1, in accordance with the first exemplary embodiment of the present invention. The projection of the raised feature 21 is shown in relation to the step pad 20. The tool member 40 comprises a flathead screwdriver 41, by example only. The tool member 40 is provided in the event that other tools may be needed in the field or on the road.

FIG. 5 is a front view of a wrench 100, as shown in FIG. 1, in accordance with the first exemplary embodiment of the present invention. The tool member 40 comprises an element such as a screwdriver, a flathead screwdriver 41 (See FIG. 4), a Phillips screwdriver, a hexagonal head screwdriver, or a prying member.

FIG. 6 is an opposing side view of a wrench 100, as shown in FIG. 1, accordance with the first exemplary embodiment of the present invention. The socket member 31 comprises a configuration for accommodating at least one fastener size and at least one fastener shape. The socket member 31 may be integrally formed with the elongated member 10.

FIG. 7 shows the preferred embodiment of the instant invention. The wrench 200 includes an elongated member 210 with a proximal end 210a that includes a step pad 220 on the opposite side of the elongated member 210 from the proximal end 210a. The distal end 210b of the elongated member is attached to an extendable tool portion 208 oriented toward the elongated member 200 at an angle theta that is between 0 and 180 degrees and preferably between 90 and 120 degrees. The tool portion 208 is attached to one or more extender portions 206 that allow for the addition of further torque by lengthening of the tool for really difficult to remove bolts.

FIG. 7A shows an exploded view with the extender 206 in place. The extender 206 attaches to the elongated member 210 through a fitting 204 that also appears as 202 between the tool portion 208 and the extender portion 206. FIG. 7B shows the connection of the tool portion 208 with the fitting 204 attaching directly to the elongated portion 210 without an extender.

As seen in FIG. 8, the tool 100, 200 is used by a human being 60a on the front end of the car 62. The user 60a uses his foot 68 to step on the foot pad of the wrench 100, 200 in a downward direction 72 to loosen bolts from the front tire 64. To loosen, the user turns the wrench in a counterclockwise direction. User 60b demonstrates the tightening function on the rear tire 66 of the car 62. The user 60b uses his foot 68 to step on the pad of the wrench 100, 200 in a downward direction 70. To tighten, the user turns the wrench in a clockwise direction.

The discussion included in this patent is intended to serve as a basic description. The reader should be aware that the specific discussion may not explicitly describe all embodiments possible and alternatives that are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A wrench for handling a fastener, comprising:
   an elongated member having a proximal end and a distal end;
   a step pad having disposed proximate the elongated member proximal end along the same plane as said elongated member and not offset therefrom and for providing additional torque; and
   a tool for attachment to bolts that require tightening or loosening that is also attached to said distal end of said elongated member wherein said tool is extendible to allow for the attachment thereto of extending members to provide for additional length of said tool as needed for additional reach wherein said tool is attached to said elongated member at an angle between 45 and 180 degrees.

2. The wrench as defined in claim 1 wherein said angle is between 90 and 120 degrees.

3. The wrench as defined in claim 1 wherein said tool has an extending member attached thereto that acts as an extension of the tool terminating in a second tool member thereby allowing deeper reach of the tool in the case of deep dish lug nuts.

4. The wrench as defined in claim 1 wherein there is a third tool member located next to said step pad wherein said third tool is a prying member.

5. The wrench as defined in claim 1 wherein the step pad comprises at least one configuration selected from a group consisting essentially of a polygonal shape, a square shape, a rectangular shape, a triangular shape, a curved shape, a circular shape, and an elliptical shape.

6. The wrench as defined in claim 1 wherein the step pad comprises a raised feature for providing additional friction for a user's foot.

7. The wrench as defined in claim 6 wherein the raised feature comprises at least one element selected from a group consisting essentially of a tread distribution, a diamond-shaped tread distribution, a herringbone-shaped tread distribution, and an oblique channel-shaped tread distribution.

* * * * *